United States Patent
Kuehnel et al.

(10) Patent No.: US 7,814,538 B2
(45) Date of Patent: Oct. 12, 2010

(54) TWO-WAY AUTHENTICATION USING A COMBINED CODE

(75) Inventors: Thomas W. Kuehnel, Seattle, WA (US); Shannon J. Chan, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1030 days.

(21) Appl. No.: 11/300,631

(22) Filed: Dec. 13, 2005

(65) Prior Publication Data

US 2007/0136800 A1 Jun. 14, 2007

(51) Int. Cl.
G06F 7/04 (2006.01)
G06F 15/16 (2006.01)
G06F 17/30 (2006.01)
H04L 29/06 (2006.01)

(52) U.S. Cl. .................. 726/10; 726/5; 726/9; 726/18; 726/19

(58) Field of Classification Search .................. 713/181, 713/183, 184, 168, 202; 726/5, 9–10, 18–19
See application file for complete search history.

(56) References Cited

U.S. PATENT DOCUMENTS

| 5,210,795 | A | 5/1993 | Lipner |
| 5,226,172 | A | 7/1993 | Seymour |
| 6,826,686 | B1 | 11/2004 | Peyravian |
| 6,834,112 | B1 | 12/2004 | Brickell |
| 2002/0095569 | A1* | 7/2002 | Jerdonek ................... 713/155 |

2003/0037241 A1 2/2003 Campagna (Continued)

FOREIGN PATENT DOCUMENTS

WO WO2005006703 1/2005

(Continued)

OTHER PUBLICATIONS

B. Clifford Neuman and Theodore Ts'o; Kerberos: An Authentication Service for Computer Networks; ISI/RS-94-399; Sep. 1994; University of Southern California, Information Science Institute; 4676 Admiralty Way, Marina del Rey, CA 90292-6695; http://ntrs.nasa.gov/archive/nasa/casi.ntrs.nasa.gov/19970004330_1997000619.pdf.

(Continued)

*Primary Examiner*—Matthew B Smithers
*Assistant Examiner*—Jing Sims

(57) ABSTRACT

An authentication process using a combined code as a shared secret between a client and target service is provided. The combined code is provided out-of-band and includes data to perform two-way authentication for both the client and the target service. The target service may provide the client with a certificate to establish a secure channel. The client may use the data in the combined code to validate the target service. When the target service is validated, the client may provide credentials in the combined code to the target service for authentication. In one example implementation, the combined code includes a hash of a public key. The client may compute another hash of another public key in the certificate provided by the target service and validate the service by comparing the hash in the combined code and the computed hash.

18 Claims, 8 Drawing Sheets

U.S. PATENT DOCUMENTS

| | | | |
|---|---|---|---|
| 2003/0056096 A1 | 3/2003 | Albert | |
| 2003/0065919 A1 | 4/2003 | Albert | |
| 2003/0070070 A1* | 4/2003 | Yeager et al. | 713/157 |
| 2004/0025026 A1 | 2/2004 | Karp | |
| 2004/0088348 A1* | 5/2004 | Yeager et al. | 709/202 |
| 2004/0158708 A1* | 8/2004 | Peyravian et al. | 713/156 |
| 2004/0158714 A1* | 8/2004 | Peyravian et al. | 713/171 |
| 2005/0076217 A1* | 4/2005 | Lord et al. | 713/171 |
| 2005/0166263 A1 | 7/2005 | Nanopoulos | |
| 2005/0182934 A1* | 8/2005 | Elteto | 713/169 |
| 2007/0147603 A1* | 6/2007 | Nakano et al. | 380/28 |

FOREIGN PATENT DOCUMENTS

| | | |
|---|---|---|
| WO | WO2005019974 | 3/2005 |

OTHER PUBLICATIONS

Irene Gassko, Peter S. Gemmell and Philip MacKenzie; Efficient and Fresh Certification; Abstract; Lecture Notes in Computer Science; Springer-Verlag GmbH; ISSN: 0302-9743; http://www.springerlink.com/app/home/contribution.asp?wasp=b65edd55769047ac93c1bca0a7f0af31&referrer=parent&backto=issue,23,31;journal,1818,2169;linkingpublicationresults,1:105633,1.

Yasir Ali; Adding Public Key Secruity to SSH; A Thesis; Feb. 20, 2003; Dartmouth College; Hanover, New Hamshire; http://www.cs.dartmouth.edu/~sws/theses/ali.pdf.

Neil M. Haller; The S/Key™ One-Time Password System; Abstract; Bellcore; Morristown, New Jersey; http://www.support.psi.com/support/spart/papers/password/skey.pdf.

Ingo Cyliax; Steven D. Johnson; Arriving at FPGA Based Hardware Unix-Encription Using Iterated Codesign Methods;Technical Report No. 496; Oct. 1997; Bhaskar Bose, Derivation Systems, Inc., Calrsbad CA; Computer Science Department; Indiana University; Bloomington, Indiana 47405-4101; http://grouchy.cs.indiana.edu/l/www/ftp/techreports/TR496.pdf.

* cited by examiner

US 7,814,538 B2

TWO-WAY AUTHENTICATION USING A COMBINED CODE

BACKGROUND

In today's computing environment, users often need to connect their computers to other networked devices to efficiently complete their tasks. These devices are connected to one another through networks that often provide little or no security. In these situations, complicated authentication procedures are required to ensure security. These complex procedures are often difficult for non-professional users to perform and can lead to undesirable loss of time and effort.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

The present example provides an authentication process using a concatenation of codes as a shared secret between a client and target service typically hosted by a device. The combined code is provided out-of-band and includes data to perform two-way authentication for both the client and the target service. The target service provides the client with a certificate for authentication as part of the handshake to establish a secure channel. If the client is unable to validate the certificate, the client uses one part of the combined code to validate the certificate sent by the target service. When the certificate is validated, the client sends the shared secret that makes up one part of the combined code to the target service for its own authentication.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in a two-way authentication system using a combined authentication code, the system described is provided as an example and not a limitation. As those skilled in the art will appreciate, the present examples are suitable for application in a variety of different types of authentication systems with authentication codes that include information for multiple authentication mechanisms.

Figure 1:
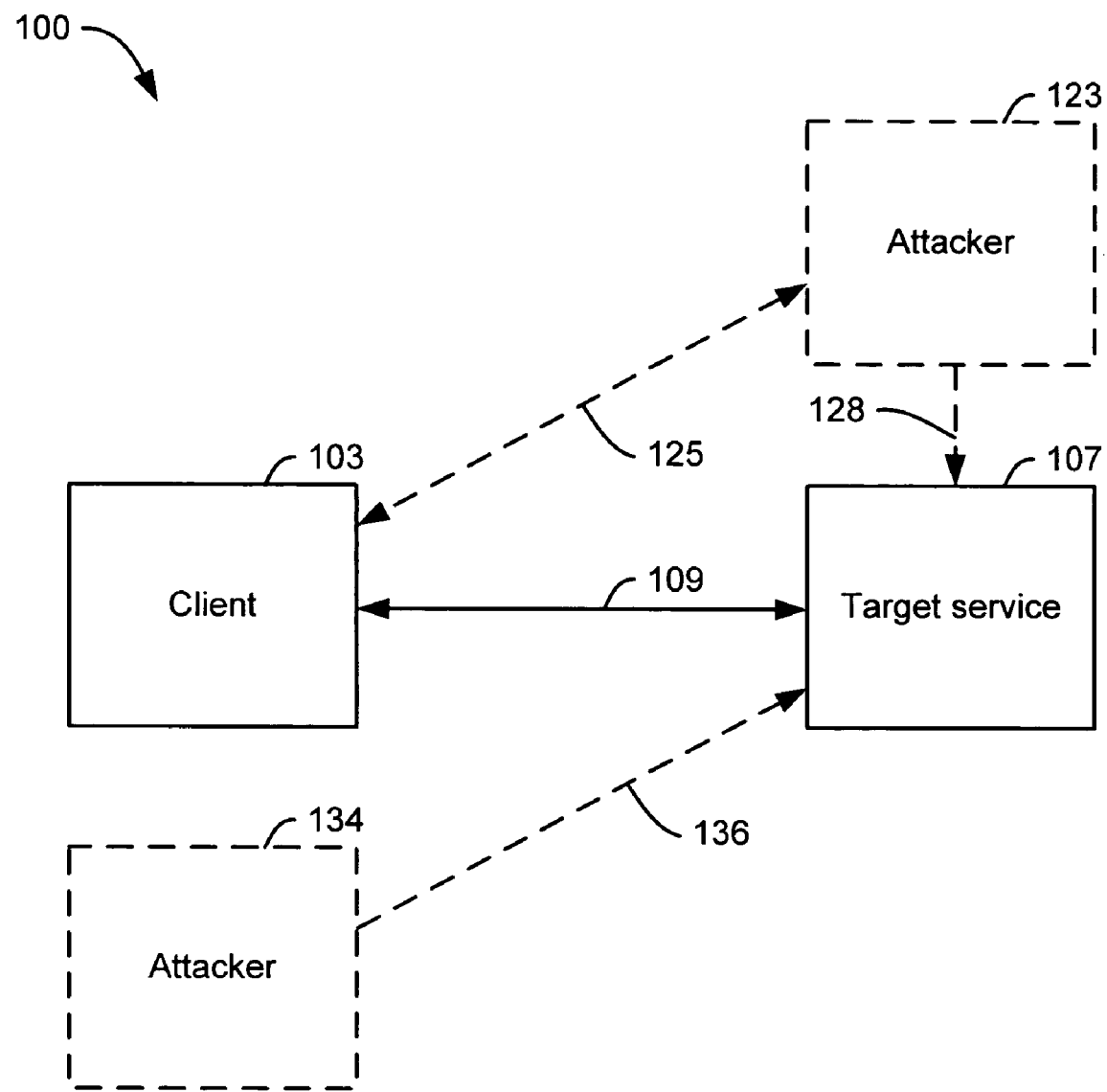
FIG. 1 shows an example process for a client to connect to a target service.

FIG. 1 shows an example process 100 for a client 103 to connect to a target service 107. Client 103 can be any type of executable component that can connect to services over any type of wired or wireless networks. Client 103 may be implemented in any computing devices, such as personal computers, personal digital assistants (PDAs), mobile devices, wireless phones, or the like. Target service 107 includes any type of executable components that can provide services through a network, such as web services. Target service 107 may be implemented in any type of network devices (e.g. devices connected to a network), such as computing devices, network appliances like wireless access points, printers, routers, scanner, cameras, and phones. Client 103 and target service 107 may interact through communication link 109, which may be established by any type of networks. Communication link 109 may be established on a network that is not secure.

To ensure a certain level of security, target service 107 may each require an authentication process for clients that seek a connection, such as providing a valid authentication code. Although the use of an authentication code provides some level of security, this process may be overcome by various means. For example, if client 103 possesses an authentication code and is trying to connect to target service 107, an attacker 123 may spoof client 103 into accepting that attacker 123 is target service 107. As illustrated by communication 125, attacker 123 may then request client 103 to provide the authentication code and receive the code from client 103, which falsely believes that it is providing the code to target service 107. Using the code, attacker 123 may connect to target service 107 using the falsely acquired authentication code, as shown by communication 128. Security may also be immediately compromised by a lost authentication code. For example, attacker 134 may use a stolen authentication code to connect to target service 107, as shown by communication 136. An example system that uses a combined authentication code for two-way authentication will be discussed below in conjunction with FIG. 2, which is capable of overcoming these security problems.

Figure 2:
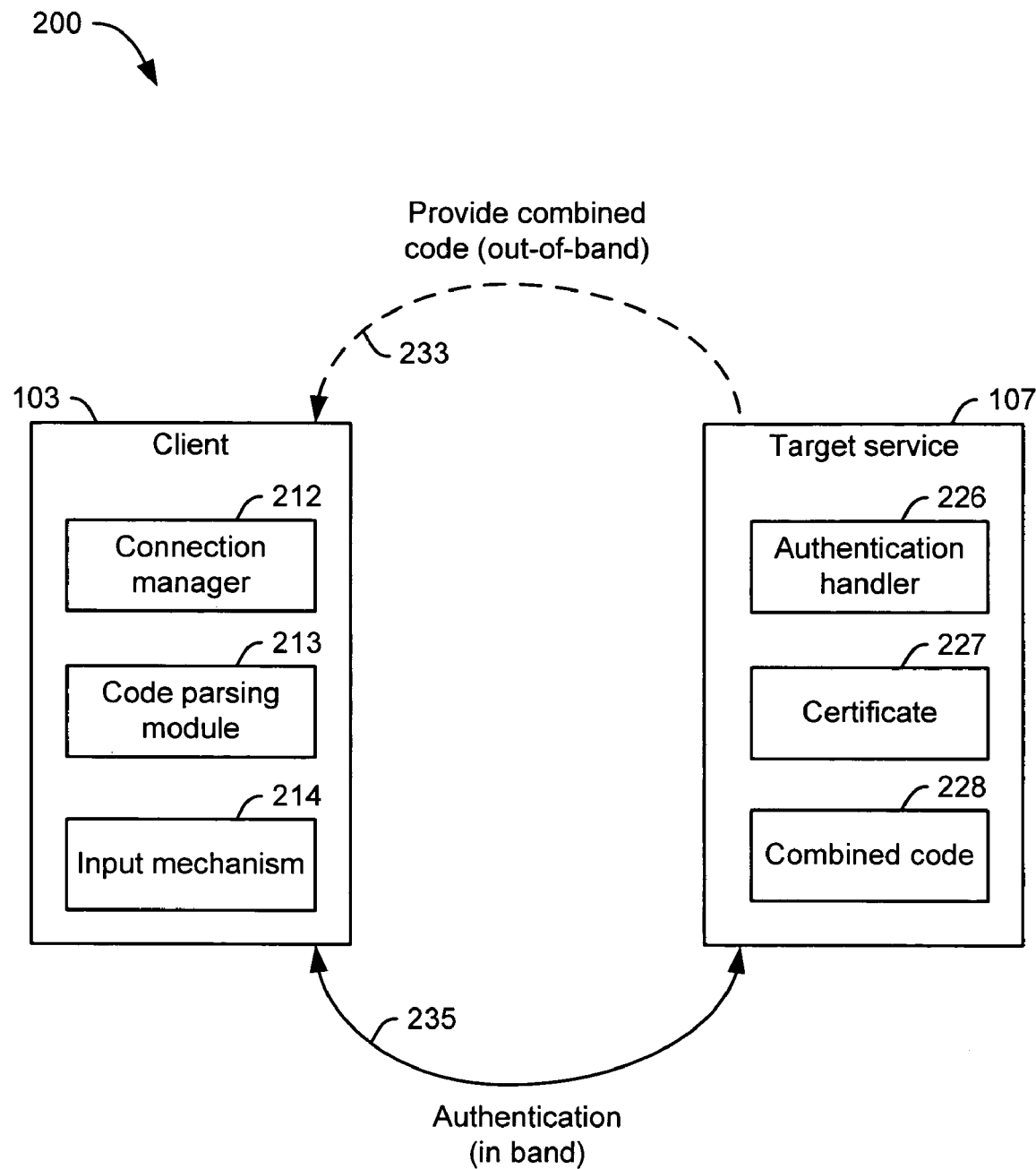
FIG. 2 shows an example system for performing authentication using a combined code.

FIG. 2 shows an example system 200 for performing authentication using a combined code. As shown in FIG. 2, target service 107 may include authentication handler 226, certificate 227 and combined code 228. Authentication handler 226 is configured to authenticate executable components that request to establish a connection to target service 107. In particular, authentication handler 226 may request a connecting client, such as client 103, to provide credential that validates the client as being authorized to make the connection. Authentication handler 226 is also configured to establish a secure channel with client 103 using certificate 227. A certificate 227 with a public key is provided to client 103. The public key is then used by client 103 to authenticate target service 107. In a conventional system, a certificate typically provides meaningful security only if it is validated by a trusted third party. However, system 200 enables client 103 to authenticate target service 107 using a self-created certificate provided by the service. This is helpful as both client 103 and target service 107 may have no means to validate the authenticity of the certificates sent.

Combined code 228 includes data that enables multiple levels of authentication. In example system 200, combined code 228 contains data that is used by client 103 and target service 107 to authenticate each other. For example, combined code 228 may include data for validating target service 107, such as a hash of the public key corresponding to the certificate. Combined code 228 may also include credential for client 103 to be authenticated by target service 107. The authentication processes between client 103 and target service 107 to mutually authenticate each other can include any type of processes and can occur in any order. Particularly, one or more sets of data for the authentication processes are incorporated into combined code 228. To enable a connection, combined code 228 is provided to client 103, which uses the data in the code to authenticate target service 107 and to be authenticated by target service 107. Combined code 228 may be provided by any type of mechanisms, such as a physical label on the device including text or bar code, providing in a message like an email, radio frequency identification (RFID), magnetic data strip, optical communications, wired or wireless data connection such as universal serial bus (USB) and Bluetooth, and the like.

As shown in FIG. 2, client 103 may be configured with connection manager 212, code parsing module 213, and input mechanism 214. Connection manager 212 is configured to establish a connection with other devices, such as target service 107. In particular, connection manager 212 is configured to authenticate target service 107 to which client 103 seek to connect and to provide credential to target service 107 for authentication. In the example system 200, connection manager 212 receives combined code 228 that contains the data for use with the mutual authentication process with target service 107. Typically, combined code 228 is provided by a user through input mechanism 214, which may include any input method, such as entering the combined code through a user-interface, a bar code scanner, RFID reader, data connection such as USB, and the like. Code parsing module 213 is configured to parse combined code 228 provided by target service 107 to obtain the data in the code for client 103 to authenticate target service 107 and the data for target service 107 to authenticate client 103.

In operation, client 103 and target service 107 establish a shared secret for mutual authentication. Specifically, the share secret is combined code 228 that is provided by target service 107 to client 103. Combined code 228 is typically provided outside of the connection process (i.e. out-of-band), as illustrated by indication 233. A user may obtain combined code 228 from target service 107 or other means associated with target service 107. For example, the user may obtain combined code 228 from a label on target service 107 and enter the code into client 103 through input mechanism 214 provided by connection manager 212.

To establish a connection with target service 107, connection manager 212 identifies, in combined code 228, data for authenticating target service 107 and data for target service 107 to authenticate client 103. These two types of data are combined and incorporated into combined code 228. The data for authenticating target service 107 typically includes information that can be used to validate data that is provided by target service 107 during the process of establishing connection. For example, the data may include a hash of a public key associated with certificate 227. The data can be used by client 103 to distinguish the valid target service 107 from a malicious attacker.

The data for target service 107 to authenticate client 103 usually includes credential for target service 107 to verify whether the connection request is issued from a legitimate party and is valid. The interactions that involve the passing of credential and other related information between client 103 and target service 107 are represented by communications 235 that occur as network communications (i.e. in-band). These network communications will be discussed in more detail in conjunction with FIG. 4.

The example system 200 described above employs a combined code as a shared secret between client 103 and target service 107. The combined code includes data to perform two-way authentication for both client 103 and target service 107 and greatly simplifies the mutual authentication process. Also, system 200 may be implemented on a conventional HTTP secure communication framework and using a combined code that can be easily communicated out-of-band. Furthermore, system 200 may be implemented using a self-signed certificate, while still providing a high level of security.

For repeated connections, if the authentication process was performed successful, the device trusts the client and may mark a certificate that was submitted by the client as part of the TLS (HTTPS) handshake as trusted. In order to link the code for the validation of the target service certificate to the actual certificate sent, the code and certificate may be cryptographically related. This can be done by computing the hash, e.g. MD5 or SHA, of public key carried in the certificate and using it as the validation code. As during the TLS handshake, the public key carried in the certificate is verified to match the sender's private key the hash; the code conveyed out of band validates the actual device as seen by the user with the credentials provided. By not returning the entire combined code but only the shared secret that is to be validated by the target service, a malicious device can obtain the shared secret belonging to a genuine target service that the user intends to connect to the client.

Figure 3:
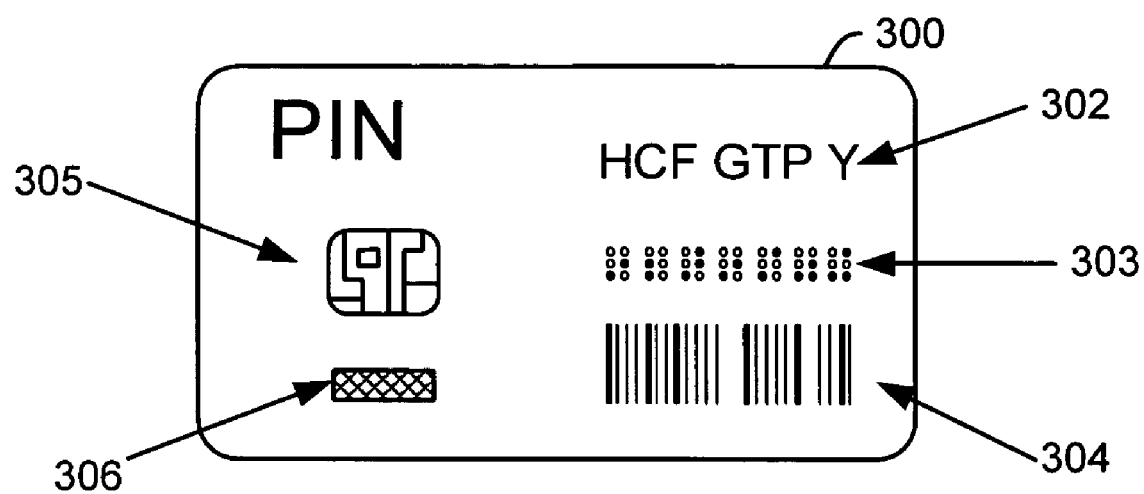
FIG. 3 shows example mechanisms for providing a combined code.

FIG. 3 shows example mechanisms for providing a combined code. In this example, label 300 is used to provide the combined code and may include one of more of the mechanisms 302-306. Label 300 may be attached a device with a target service that enables authorized clients to establish a connection. Access to label 300 is limited to authorized users. A user may obtain the combined code from label 300 and provide the code to a client for connecting to the target service.

As shown in FIG. 3, label 300 may include text 302, which embodies the combined code as text characters. The text character code may be input to the client for the authentication process. Label 300 may also include the combined code as Braille 303 or any form of human readable symbols that can be input to a client. Label 300 may also include machine-readable code, such as barcode 304, that can be read by a mechanical device and communicated to the client. An RF device 305 may also be implemented on label 300 to provide the combined code as an RFID or other forms of wireless data. Label 300 may further be used to indicate data connection port 306, such as a USB port. A user may use data connection port 306 to transmit the combined code directly to a client or indirectly to an intermediate device, such as a flash memory drive.

Figure 4:
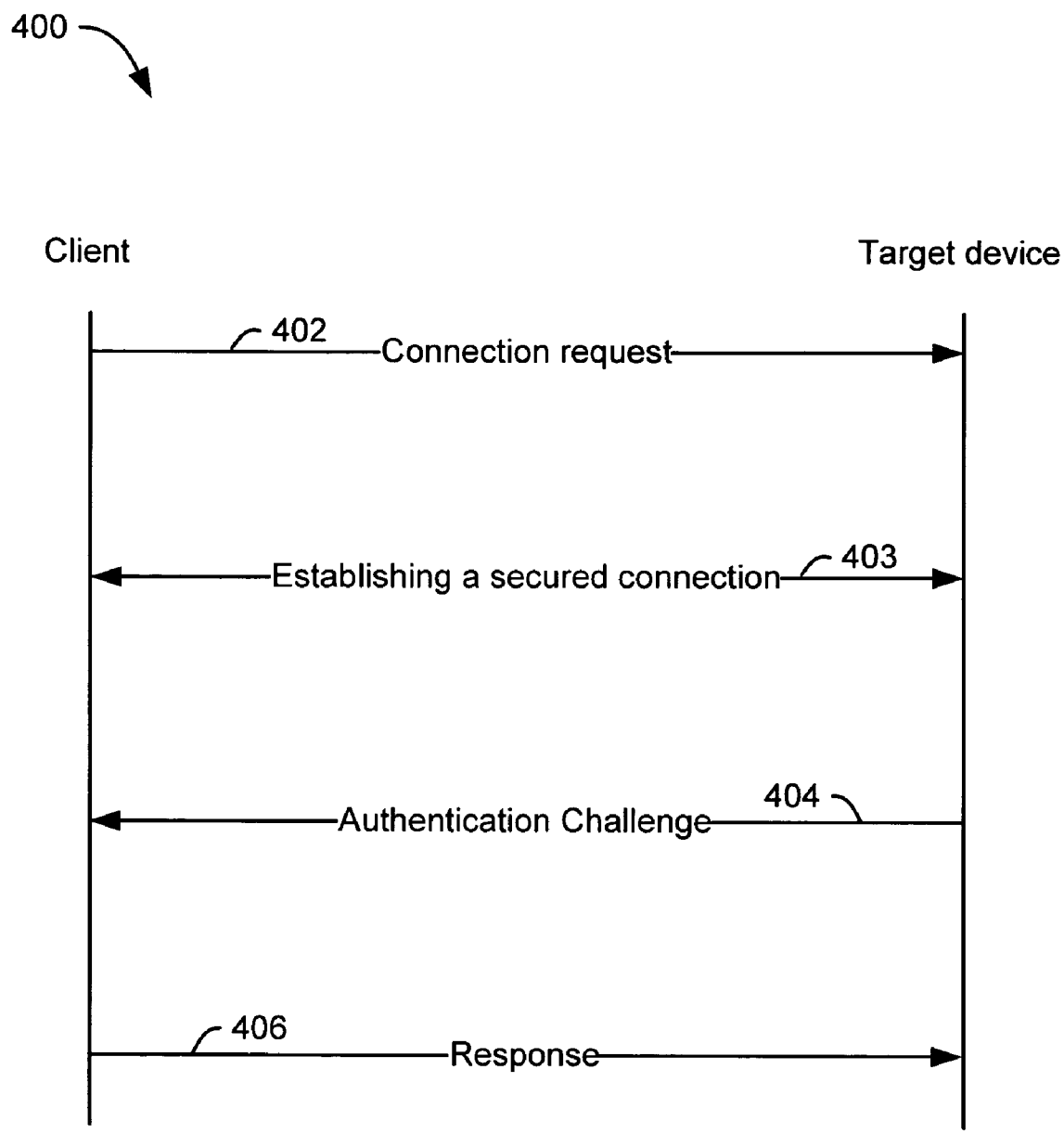
FIG. 4 shows an example authentication process for establishing a connection between a client and a target service with authentication data in a combined code.

FIG. 4 shows an example authentication process 400 for establishing a connection between a client and a target service with authentication data in a combined code. The example process 400 is started when the client has acquired a combined code out-of-band and has identified the target service for connection. The client sends message 402 that includes a connection request, such as an HTTP request. The client and target service then establish a secure channel with communications 403. For example, the secure channel may be established via Transport Layer Security (TLS) protocols. Typically, target service provides a certificate to the client, which identifies the public key included in the certificate. The client then computes a hash value of the public key in the certificate and compares the computed hash value with the hash value included in the combined code. If the two hash values match, the client validates and establishes a secure channel with the target service.

After the secure channel has been established, the target service may request authentication of the client, such as HTTP authentication. As shown in FIG. 4, the target service may send message 404 with an error code and an authentication challenge in response to a HTTP request. The client determines credential from the combined code and provides the requested credential to the target service for authentication. For example, the client may include the credential in the header field of response 406, which may be a renewed HTTP Request.

As part of the credential sent in the response 406, the combined code (such as a password) along with a login name may be conveyed. Depending on the authentication scheme used, the combined code may be sent in clear (Basic Authentication) or sent in form of a Digest (Digest Authentication).

In one implementation, the combined code may be queried upon reception of the authentication challenge 404 or cached from a previous user interaction. For example, following successful authentication using HTTP, the respective certificates exchanged during the TLS authentication exchange may be marked as trusted and stored in the respective trusted certificate store. Thus, subsequent re-boots or hibernation states may not require any user interaction in form of HTTP authentication. As the device profile assumes HTTP authentication following the establishment of the secure channel, basic HTTP authentication may be sufficient for the security requirements and may create less burden on a resource constrained device.

The login name may be conveyed in response 406 as part of the credential. The login name can facilitate different access permissions for different users or applications. The login name may be sent in the HTTP authentication header. The login name may be established as a default. In the absence of an explicit login name, the combined code may be established as related to the default login name.

Additional login names may be defined by the device vendor to allow for multiple access privileges. Access privileges may be associated with specific (pre-defined) login names. A combined code may be paired with each login name. The length and character set used for the combined code is typically a tradeoff between security and usability. To provide acceptable security and prevent guessing attacks, the combined code may follow the following rules:

1) Variable length (Minimum 8 characters/digits)
2) English upper case character (A . . . Z) or/and Base 10 Digits (0 . . . 9)
3) Random value and unique to the specific device
4) To avoid misunderstandings zero (0) and the "O" character (O) may be used inter changeably.
5) Clear character representation may be chosen to avoid confusion between different characters or/and numbers such as: I, 1 D, O, Q To allow clients with limited input capabilities to participate in the authentication process, non-alphanumeric characters and lower case characters may be avoided. To ensure security, the combined code may be implemented without the following:

1) Resemble a real name or any other common name
2) Use easy to guess passwords such as "admin, 12345, 55555"

Figure 5:
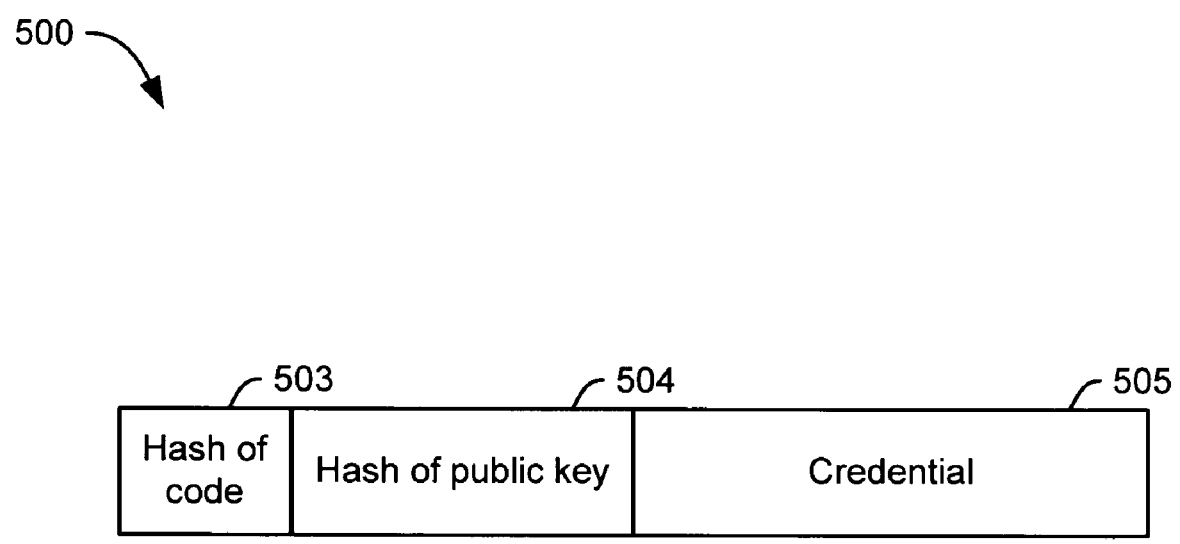
FIG. 5 shows an example combined code.

FIG. 5 shows an example combined code 500. As shown in FIG. 5, example combined code 500 may include data fields 503-505. Data field 504 includes the hash of a public key that is included in a certificate associated with a target service. The hash value in data field 504 may be used by a client to authenticate a target device during the establishment of a secure channel between the client and the target service. Data field 505 includes credential that may be provided by the client to the target service for authentication.

Combined code 500 may be a data structure of any length. In one implementation, data fields 504-505 are organized in a sequential manner and the length ratio of data field 504 to data field 505 is fixed to allow for a variable length for combined code 500. For example, length ratio may be 1:1 (i.e. for every digit of credential, one digit of hash is used). In another implementation, the length ratio of data fields 504-505 may be of any value. For example, another field may be added to combined code 500 to indicate the length of each of the data fields 504-505. The other field may also include data for parsing each of the data fields 504-505 if the data of the two fields is organized in a manner that is not sequential (e.g. mixing the characters from each field). As indicated in FIG. 5, data field 503 may be included in combined code 500. Data field 503 may include a hash of the combined code 500 for typo correction. Data field 503 may also be used for determining the encoding for the hash of the public key. Below is example data for combined code 500:

Y      2RTDCK      UF4RT3

(Hash of code) (Credential) (Hash of Public Key)

A target service may use any hashing function to compute the hash of the public key carried in the certificate. For example, the target service may use a SHA-1 function. The most significant bits may be encoded to match the input string. The hash of the combined code may be computed by applying a SHA-1 hash over the combined credential and the hash of the public key parts.

In one implementation, the hash of the public key is encoded base35 for representation of the supported character set, i.e. English upper case character set (A . . . N, P . . . Z), and numeric digits (0 . . . 9) using the following order:

'0123456789ABCDEFGHIJKLMNPQRSTUVWXYZ'

The character "O" may be treated as "0" to prevent confusion due to the similar representation of both. Below is an example of an encoding:

$QLFD45_{base36} = 1608109349_{base10}$

The encoding for the combined code may be base10 of the representation of the numeric digits 0 . . . 9.

The distinction of the different encoding schemes may be accomplished by the hash of the combined code. For example, if the hash of the combined code uses a character for its encoding, the hash of the public key may be encoded in base35 character set. In this case, the hash of the combined code is encoded as base25 using the following character set and order:

'ABCDEFGHIJKLMNPQRSTUVWXYZ'

The character "O" may be omitted to avoid any possible confusion with "0" zero.

If the hash of the combined code uses a numeric value for its encoding, the hash of the public key may be encoded in base10 character set. In this case, the hash of the combined code may be encoded as base10 using the following character set and order:

'0123456789'

Again, the character "O" is treated as "0" to avoid any possible confusion with zero.

In an example implementation, the hash of the combined code is encoded base25; the credential is encoded base64 and sent over the wire; the hash of the public key is encoded base35. The determination of the coding format may be based on the first character entered (hash of the combined code).

In another example implementation, only the credential is sent over the wire during HTTP authentication. The credential is encoded as Base64. The hash of the public key of the target service carried in the certificate as well as the hash of the combined code is not sent over the wire as part of the authentication credential.

To enhance security, the client may only send the combined code to the target service if the hash part of the combined code entered by the user matches the computed hash of the public key carried in the certificate supplied by the target service. If the entered string does not match the computed hash of the combined code (i.e. credential and hash of public key), a typing error can be assumed. The client may notify the user in this case.

Based on the first character entered, the client may compute the representation of the hash of the certificate field. For example, if the first (leftmost) character that carries the hash of the remaining combined code is in the range 0 . . . 9, the hash representation of the public key may be numerical (i.e. base10). Conversely, if the first character is an alpha character (A . . . N, P . . . Z), the hash of the public key may be encoded base25. The client may perform plausibility tests of entered combined codes, such as representations match.

To further enhance security, the client and the target service may deploy mechanisms to reduce the attack surface for combined codes. For example, the following may be implemented:
1) One time code (The combined code is changed following each use)
   Hardware Reset needed to restore original code
2) Limited number of wrong attempts (e.g. 3)
   After a limited number of attempts, e.g. 3, the code is disabled.
   A hardware reset or a special unblocking key, similar to PIN/PUK in GSM, is required to re-activate the device. There may be a minimum time interval between subsequent attempts.

Figure 6:
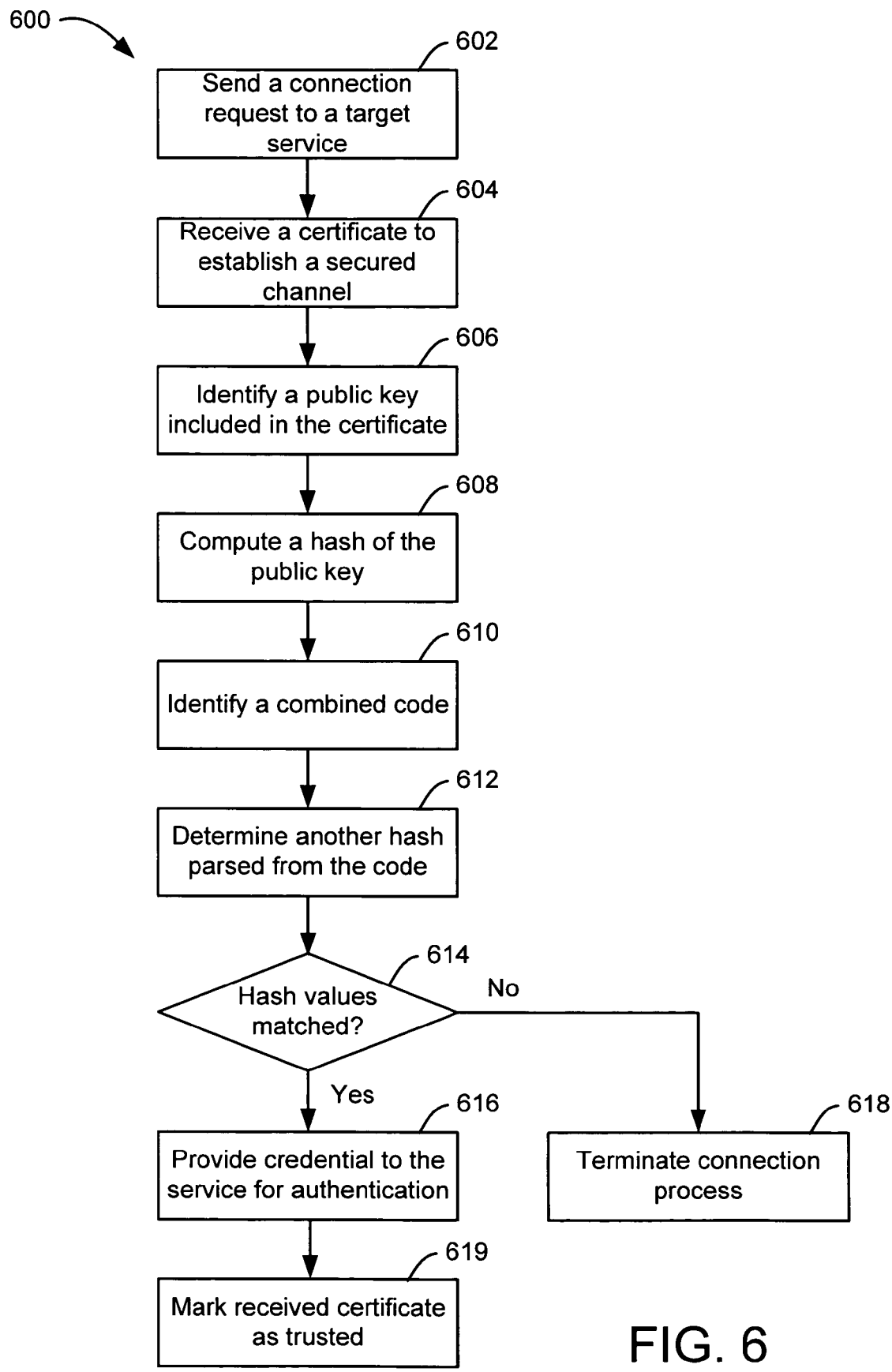
FIG. 6 shows an example process for authenticating a connection target using data in a combined authentication code.

FIG. 6 shows an example process 600 for authenticating a target service using data in a combined authentication code. Process 600 may be implemented by a client to authenticate a target service before providing credential for establishing a connection. At block 602, a connection request is sent to the target service. At block 604, a certificate is received from the target service to establish a secure channel. The client may not have the means to validate the certificate as it may be a self-signed certificate that has not been marked as trusted.

At block 606, a public key included in the certificate is identified. At block 608, a hash of the public key is computed. At block 610, a combined code is identified. The combined code is typically acquired from the target service out-of-band. At block 612, another hash is determined by parsing the combined code. In one implementation, the hash is part of a string of a text combined code.

At decision block 614, a determination is made whether the computed hash and the hash determined from the combined code match. If so, process 600 moves to block 616 where credential is provided to the target service for authentication. If the hash values do not match, the process goes to block 618 where the connection process is terminated.

If the certificate received from the target service could be validated using the hash of the public key carried in the certificate supplied during the establishment of the secure connection, the certificate can be marked as trusted as shown in block 619 and stored in the trusted certificate store. As a result, subsequent connection requests do not require that shared secrets are conveyed out-of-band as the certificate is already trusted.

Figure 7:
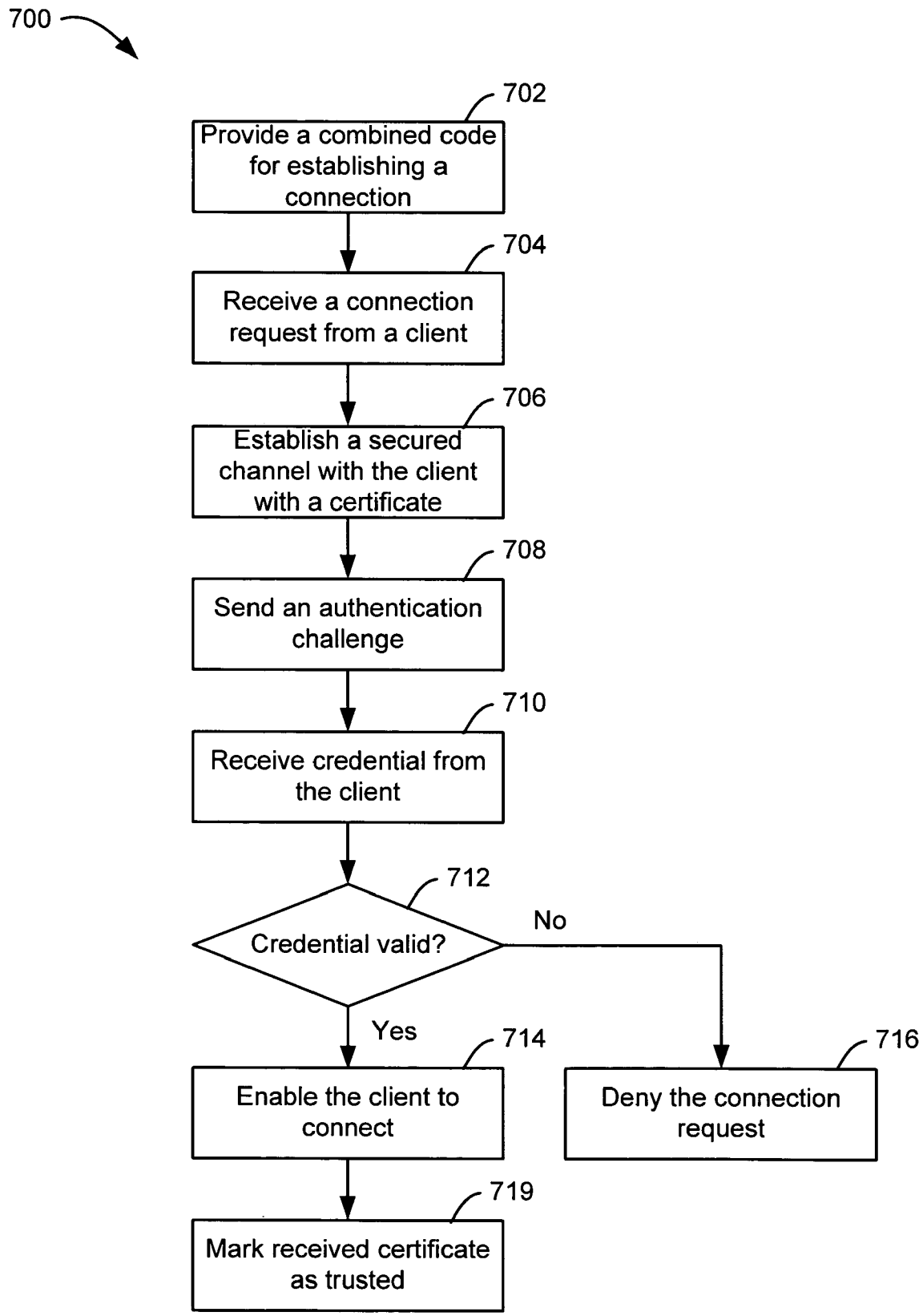
FIG. 7 shows an example process for authenticating a client that requests a connection.

FIG. 7 shows an example process 700 for authenticating a client that requests a connection. Process 700 may be implemented by a target service to authenticate a client. At block 702, a combined code is provided to an authorized party for establishing a connection with the target service. Typically, the combined code is provided out-of-band. At block 704, a connection request is received from a client. At block 706, a secure channel is established with the client with a certificate. The target service may provide the client with the certificate, which includes a public key. The hash of the public key is included in the combined code.

At block 708, an authentication challenge is sent to the client. At block 710, credential is received from the client. At decision block 712, a determination is made whether the credential is valid. The credential is included in the combined code provided to the authorized party. If the credential is valid, process 700 moves to block 714 where the target device enables the client to connect. If the credential is not valid, the process goes to block 716 where the connection request is denied.

If the certificate received from the client could be validated using the hash of the public key carried in the certificate supplied during the establishment of the secure connection, the certificate can be marked as trusted as shown in block 719 and stored in the trusted certificate store. As a result, subsequent connection requests do not require that shared secrets are conveyed out of band as the certificate is already trusted.

Figure 8:
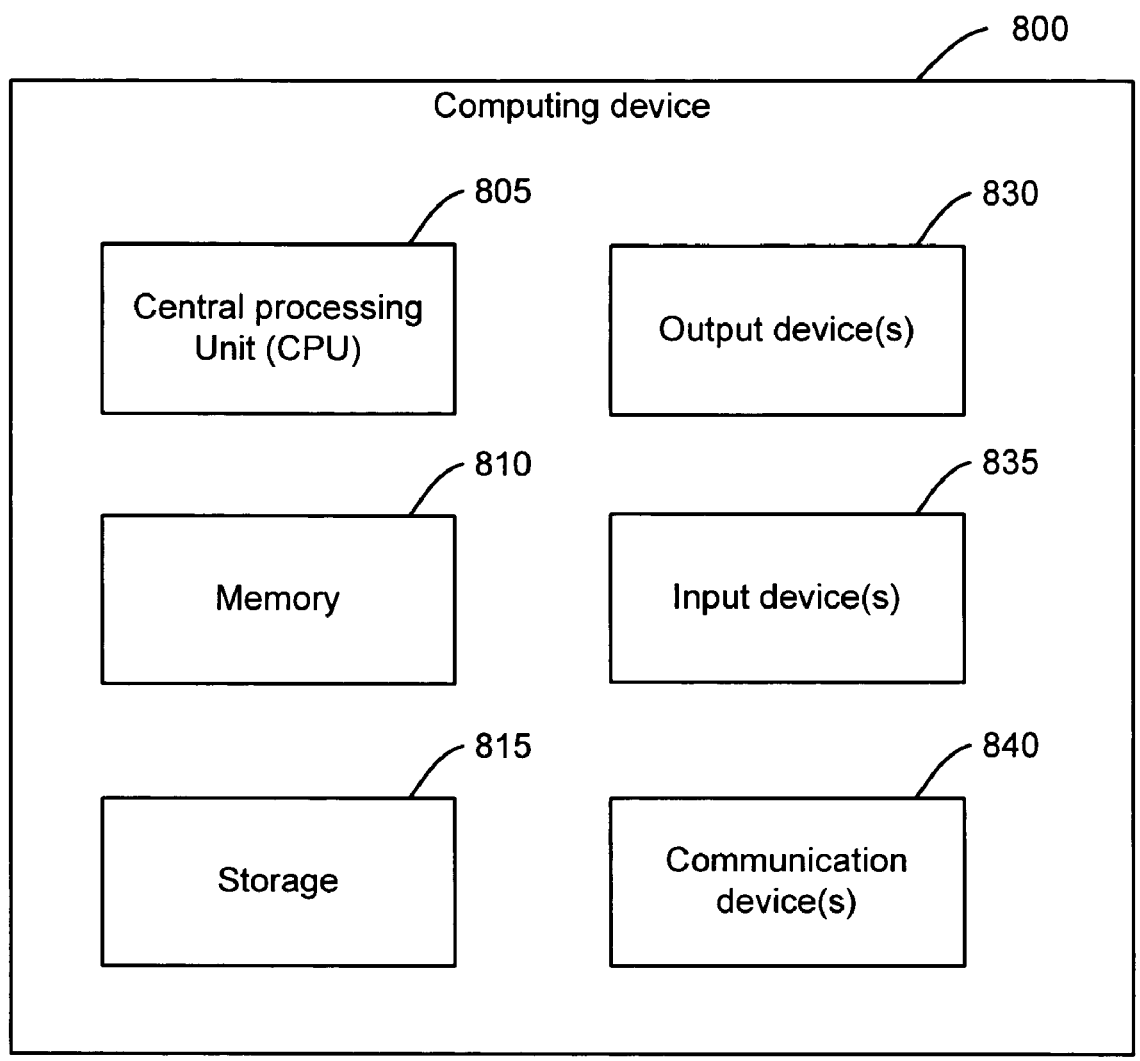
FIG. 8 shows an exemplary computer device for implementing the described systems and methods.

FIG. 8 shows an exemplary computer device 800 for implementing the described systems and methods. In its most basic configuration, computing device 800 typically includes at least one central processing unit (CPU) 805 and memory 810.

Depending on the exact configuration and type of computing device, memory 810 may be volatile (such as RAM), non-volatile (such as ROM, flash memory, etc.) or some combination of the two. Additionally, computing device 800 may also have additional features/functionality. For example, computing device 800 may include multiple CPU's. The described methods may be executed in any manner by any processing unit in computing device 800. For example, the described process may be executed by both multiple CPU's in parallel.

Computing device 800 may also include additional storage (removable and/or non-removable) including, but not limited to, magnetic or optical disks or tape. Such additional storage is illustrated in FIG. 8 by storage 815. Computer storage media includes volatile and nonvolatile, removable and non-removable media implemented in any method or technology for storage of information such as computer readable instructions, data structures, program modules or other data. Memory 810 and storage 815 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computing device 800. Any such computer storage media may be part of computing device 800.

Computing device 800 may also contain communications device(s) 840 that allow the device to communicate with other devices. Communications device(s) 840 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer-readable media as used herein includes both computer storage media and communication media. The described methods may be encoded in any computer-readable media in any form, such as data, computer-executable instructions, and the like.

Computing device 800 may also have input device(s) 835 such as keyboard, mouse, pen, voice input device, touch input device, etc. Output device(s) 830 such as a display, speakers, printer, etc. may also be included. All these devices are well know in the art and need not be discussed at length.

Those skilled in the art will realize that storage devices utilized to store program instructions can be distributed across a network. For example a remote computer may store an example of the process described as software. A local or terminal computer may access the remote computer and download a part or all of the software to run the program. Alternatively the local computer may download pieces of the software as needed, or distributive process by executing some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

The invention claimed is:

1. A device comprising:
   one or more device-readable storage media encoded with device executable instructions for performing a method comprising:
   identifying in a combined code at least two sets of data for authentication, the combined code being received out-of-band and comprising a combined code hash of the at least two sets of data from which an encoding scheme of the at least two sets of data can be determined;
   sending a connection request to a target service;
   receiving a certificate from the target service for establishing a secure channel;
   validating the certificate with a first set of data included in the combined code, the first set of data including a first hash of a public key associated with the certificate; and
   when the certificate is validated, identifying in the combined code a second set of data that includes a credential for authentication, and providing the credential to the target service.

2. The device as recited in claim 1, wherein the one or more device-readable storage media comprises executable instructions for performing a method further comprising:
   identifying the public key included in the certificate;
   computing a second hash of the public key in the certificate; and
   when the first hash and second hash match, determining that the certificate is valid.

3. The device as recited in claim 1, wherein the combined code is received out-of-band via at least one of entering the combined code through a user-interface, a bar code scanner, radio frequency identification (RFID) reader, wired data connection, wireless data connection, or optical data communication.

4. The device as recited in claim 1, wherein the one or more device-readable storage media comprises executable instructions for performing a method further comprising:
   determining an indicator in the combined code; and
   parsing the combined code to identify the at least two sets of data based, at least in part, on the indicator.

5. The device as recited in claim 1, wherein the target service is included in at least one of a network device, a computer device, a network appliance, a wireless access point, a printer, a router, a scanner, a phone, or a camera.

6. A server device comprising:
   at least one memory; and
   at least one processing unit configured to:
   offer services to a client through a network connection;
   provide a combined code containing data for the client to authenticate the server device and a certificate to establish a secure channel with the client, the data comprising a hash of a public key included in the certificate, the combined code being provided to the client out-of-band, the combined code also containing a first credential and a combined code hash of the combined code to enable the client to determine an encoding scheme of at least the hash of the public key, the certificate including data verifiable by the data in the combined code;
   receive a second credential from the client via an established secure channel; and
   authenticate the client by comparing the second credential with the first credential.

7. The device as recited in claim 6, wherein the combined code provided to the client is included in at least one of a physical label on the device, a message, an email, a radio frequency identification (RFID) tag, a magnetic data strip, optical communications, or a data connection.

8. The device as recited in claim 7, wherein the combined code is displayed on the label as at least one of plain text, human-readable symbols, machine-readable data, bar code, or Braille.

9. The device as recited in claim 6, wherein the first credential in the combined code is only valid for a limited number of uses.

10. The device as recited in claim 6, wherein the at least one processing unit is further configured to require the client to provide a valid credential within a limited number of attempts.

11. The device as recited in claim 6, wherein the certificate is provided to the client using Hyper-Text Transport Protocol (HTTP) communications.

12. The device as recited in claim 6, wherein the secure channel is established using Transport Layer Security (TLS) protocols.

13. The device as recited in claim 6, wherein the device is at least one of a network device, a computer device, a network appliance, a wireless access point, a printer, a router, a scanner, a phone, or a camera.

14. A computer-implemented system for establishing a connection between a client and a target service comprising:
    at least one processing unit configured to:
        incorporate data in a combined code for the client and the target service to perform mutual authentication;
        provide the combined code to the client out-of-band;
        enable the client to authenticate the target service using the data in the combined code, the data including a first hash of a public key in the combined code and a combined code hash of the combined code to enable the client to determine an encoding format of the first hash of the public key; and
        enable the client to identify a credential in the combined code and provide the credential to the target service for authentication.

15. The computer-implemented system as recited in claim 14, the at least one processing unit further configured to:
    provide a certificate to the client to establish a secure channel with the target service;
    identify the public key in the certificate;
    compute a second hash of the public key in the certificate; and
    authenticate the target service by comparing the first hash and the second hash.

16. The computer-implemented system as recited in claim 15, the at least one processing unit further configured to mark the certificate as trusted and store the certificate in a trusted certificate store when the target service is authenticated.

17. The computer-implemented system as recited in claim 14, the at least one processing unit further configured to identify a typographical error in a user input of a hash part of the combined code.

18. The computer-implemented system as recited in claim 14, the at least one processing unit further configured to:
    encode the combined code using a coding format; and
    determine the coding format based on the first character of the combined code.

* * * * *